L. C. KNEE.
CAMERA SHUTTER AND MEANS FOR OPERATING THE SAME.
APPLICATION FILED JUNE 26, 1909.
965,389.
Patented July 26, 1910.
2 SHEETS—SHEET 1.
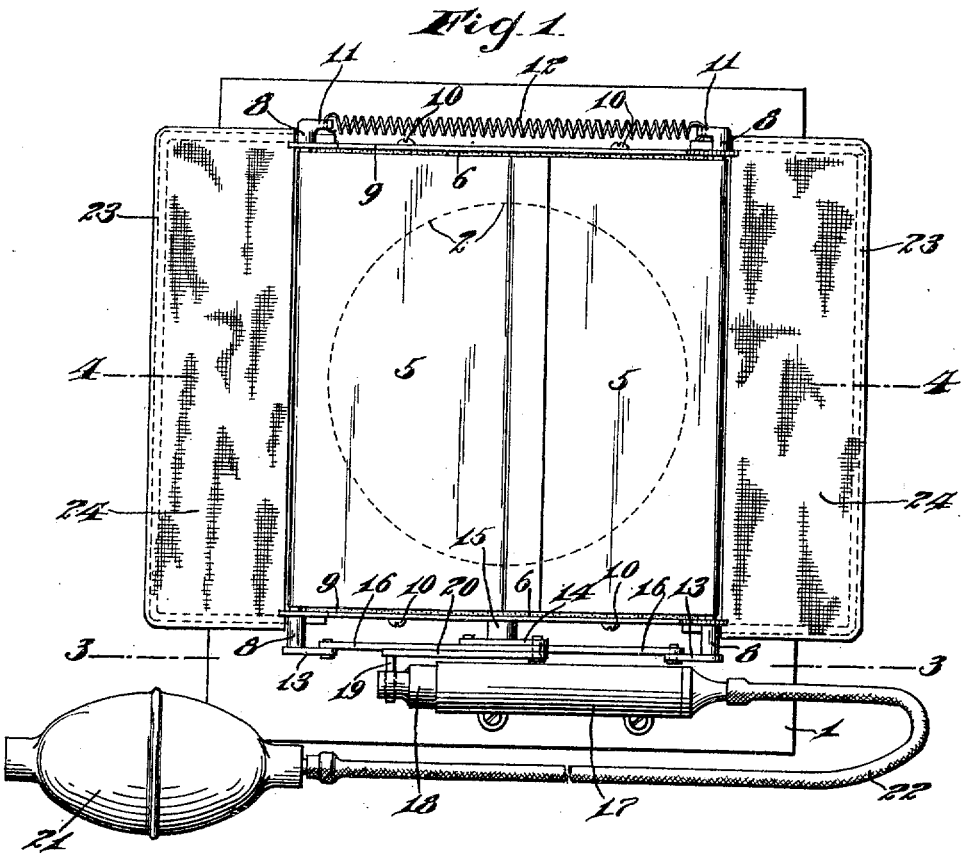
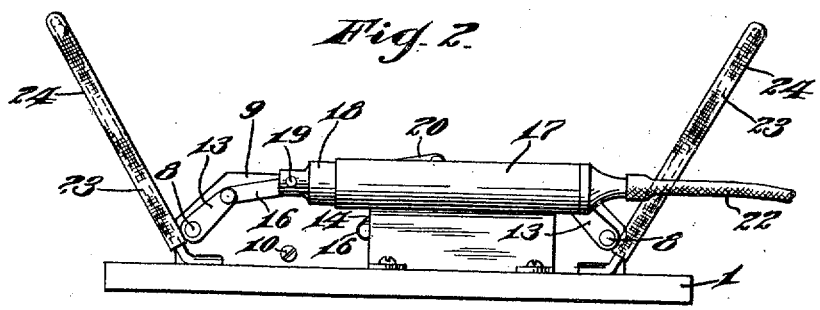
Witnesses
Inventor
*Lucious C. Knee,*
By *Joshua R. H. Potts*
Attorney L. C. KNEE.
CAMERA SHUTTER AND MEANS FOR OPERATING THE SAME.
APPLICATION FILED JUNE 26, 1909.

965,389.

Patented July 26, 1910.

2 SHEETS—SHEET 2.

Witnesses
Theo. Rosemann
J. P. L. Mulhall

Inventor
Lucious C. Knee,
By Joshua R. H. Potts.
Attorney

THE NORRIS PETERS CO., WASHINGTON, D. C.

UNITED STATES PATENT OFFICE.

LUCIOUS C. KNEE, OF PHILADELPHIA, PENNSYLVANIA, ASSIGNOR OF ONE-HALF TO ALFRED PARKER, OF PHILADELPHIA, PENNSYLVANIA.

CAMERA-SHUTTER AND MEANS FOR OPERATING THE SAME.

965,389.   Specification of Letters Patent.   Patented July 26, 1910.

Application filed June 26, 1909. Serial No. 504,408.

*To all whom it may concern:*

Be it known that I, LUCIOUS C. KNEE, a citizen of the United States, residing at Philadelphia, in the county of Philadelphia and State of Pennsplvania, have invented certain new and useful Improvements in Camera-Shutters and Means for Operating the Same, of which the following is a specification.

My invention relates to improvements in camera shutters and means for operating the same, the object of the invention being to provide improved shutters and mounting therefor, and improved operating means compelling the simultaneous operation of the shutters, rendering the operation practically noiseless, and almost instantaneously responding to the operating means, so as to permit just the desired exposure, and enable the shutter to be operated from a distance, and be under perfect control.

With these and other objects in view, the invention consists in certain novel features of construction, combinations and arrangements of parts as will be more fully hereinafter described and pointed out in the claims.

Figure 3:
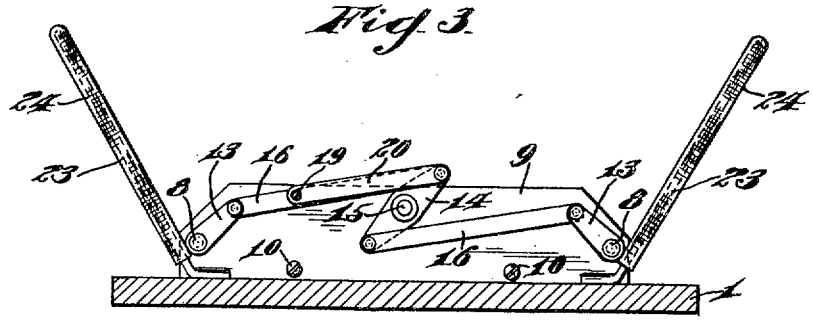
Figure 4:
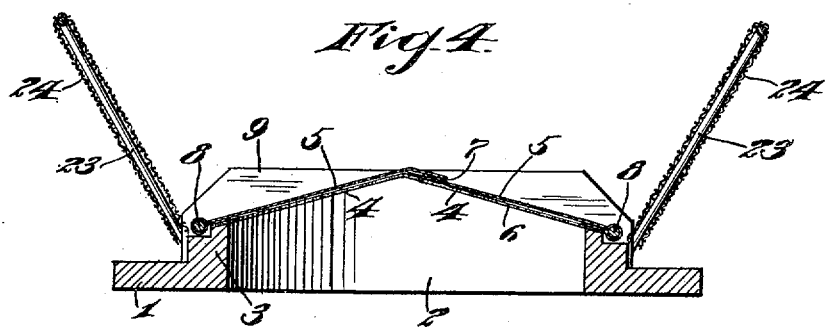
Figure 5:
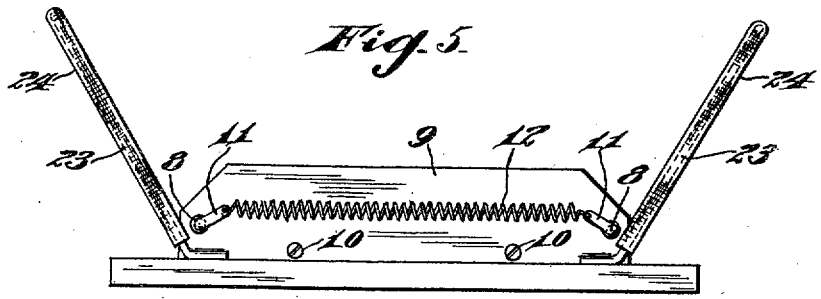

In the accompanying drawings, Figure 1, is a view in front elevation illustrating my improvements. Fig. 2, is a view in end elevation. Fig. 3, is a view in section on the line 3—3 of Fig. 1. Fig. 4, is a view in section on the line 4—4 of Fig. 1, and Fig. 5, is a view of the upper end of the shutter.

My improved shutter comprises a frame 1, of general rectangular form, having an opening 2 therein, and said frame enlarged all around said opening, forming in effect, a block 3, widest at the center and tapering toward both sides or ends, forming an inclined flat seat 4, for each shutter 5, and these seats or surfaces 4 are covered with felt as shown at 6, so that the contact of the shutters with said surfaces will be noiseless. One shutter is longer, or rather wider than the other, so as to overlap the shorter shutter, and is provided on its inner face with a strip of felt or cushioning material 7, so as to prevent the noise of contact between the shutters.

The shutters are preferably of sheet metal secured upon shafts 8, which latter project through metal bracket plates 9, the latter secured to the built out or block like portion 3, by means of screws 10. The upper ends of the shafts 8 are provided with crank arms 11, connected by a coiled spring 12, normally holding the shutters in closed position. The lower ends of shafts 8 are provided with crank arms 13, and a lever 14 is pivoted between its ends on a journal 15 secured to the lower plate 9, and the opposite ends of this lever 14 are connected by links 16 with the respective crank arms 13.

17 represents an air cylinder, and 18 a plunger or piston therein, engaging a pin 19 on a link 20, the latter pivotally connected to one end of lever 14, and 21 represents an ordinary air bulb connected by a hose 22 with the cylinder 17, so that when the bulb 21 is compressed, piston 18 will be moved, and through the medium of link 20, lever 14 will be moved and links 16 will move crank arms 13 and shafts 8, to move the shutters 5 to open position, and when pressure is released on the bulb, the spring 11 will return the parts to their former positions, closing the shutters.

To limit the opening movement of the shutters, wire frames 23 are secured to frame 1, and are covered by fabric casings 24, which are preferably of soft material, such as felt, so that when engaged by the shutters, the contact will be noiseless, rendering the opening of the shutters noiseless, as well as the closing operation.

While, I have set forth a preferred means for operating the lever 14, and the coöperating parts to open the shutters, it is apparent that I might employ other means for operating the lever, and do not therefore limit myself to the precise construction set forth, but consider myself at liberty to make such changes and alterations as fairly fall within the spirit and scope of the claims.

Having thus described my invention what I claim as new and desire to secure by Letters Patent is:

1. In a mechanism of the character described, the combination with a frame, having an opening therein, of plates secured to the frame at opposite sides of the opening, shafts mounted in said plates, shutters secured on said shafts and adapted to close said opening, crank arms at both ends of both shafts, a spring connecting the crank arms at one end of the shafts, a lever pivoted between its ends on one of said plates, links connecting respective ends of said lever with crank arms on the shafts, and means for moving said lever.

2. In a mechanism of the character described, the combination with a frame having a block or enlargement thereon, having an opening therein, said block of greatest thickness at its center, and tapering toward its ends, cushioning material on said block, plates secured to the ends of said block, shafts mounted in said plates, shutters secured on said shafts, crank arms on both ends of said shafts, a spring connecting the crank arms at one end of the shafts, and means at the other end of the shafts for turning said crank arms.

3. In a mechanism of the character described, the combination with a frame having a block or enlargement thereon, having an opening therein, said block of greatest thickness at its center, and tapering toward its ends, cushioning material on said block, plates secured to the ends of said block, shafts mounted in said plates, shutters secured on said shafts, crank arms on both ends of said shafts, a spring connecting the crank arms at one end of the shafts, a lever pivoted between its ends, links connecting the opposite ends of said lever with the crank arms on said shafts, an air cylinder, a piston in said cylinder, and a link connecting the piston with one end of said lever.

In testimony whereof I have signed my name to this specification in the presence of two subscribing witnesses.

LUCIOUS C. KNEE.

Witnesses:
R. H. KRENKEL,
J. A. L. MULHALL.